(12) United States Patent
Zhang et al.

(10) Patent No.: US 10,667,060 B2
(45) Date of Patent: May 26, 2020

(54) SOUND GENERATION DEVICE AND PREPARATION METHOD OF METAL PLASTIC PART

(71) Applicant: GOERTEK INC., Weifang, Shandong (CN)

(72) Inventors: Qingyi Zhang, Weifang (CN); Gang Chen, Weifang (CN); Zhenjun Li, Weifang (CN); Shuangshuang Fan, Weifang (CN)

(73) Assignee: GOERTEK INC., Weifang, Shandong (CN)

( * ) Notice: Subject to any disclaimer, the term of this patent is extended or adjusted under 35 U.S.C. 154(b) by 0 days.

(21) Appl. No.: 16/097,423

(22) PCT Filed: Dec. 28, 2016

(86) PCT No.: PCT/CN2016/112621
§ 371 (c)(1),
(2) Date: Oct. 29, 2018

(87) PCT Pub. No.: WO2017/185788
PCT Pub. Date: Nov. 2, 2017

(65) Prior Publication Data
US 2019/0158960 A1    May 23, 2019

(30) Foreign Application Priority Data

Apr. 29, 2016 (CN) .......................... 2016 1 0284682
Jun. 21, 2016 (CN) .......................... 2016 1 0451505

(51) Int. Cl.
*H04R 1/00* (2006.01)
*H04R 9/06* (2006.01)
(Continued)

(52) U.S. Cl.
CPC ............... *H04R 9/06* (2013.01); *B29C 45/14* (2013.01); *B29C 45/14311* (2013.01);
(Continued)

(58) Field of Classification Search
CPC ....................................................... H04R 1/00
(Continued)

(56) References Cited

U.S. PATENT DOCUMENTS

| 2012/0142141 A1* | 6/2012 | Park | H01L 45/04 |
| | | | 438/102 |
| 2014/0028163 A1* | 1/2014 | Deng | H05K 5/02 |
| | | | 312/223.1 |
| 2015/0371818 A1* | 12/2015 | Li | E21B 47/00 |
| | | | 250/307 |

FOREIGN PATENT DOCUMENTS

| CN | 102794863 A | 11/2012 |
| CN | 102794864 A | 11/2012 |

(Continued)

*Primary Examiner* — Suhan Ni
(74) *Attorney, Agent, or Firm* — Saliwanchik, Lloyd & Eisenschenk (57) ABSTRACT

The present invention provides a sound generation device and a preparation method of a metal plastic part. The sound generation device comprises a metal plastic part. The metal plastic part comprises a plastic part and a metal insert that is combined with the plastic part. An oxidation film that is obtained through metal nanocrystallization and a nanopore that is formed in a surface of the oxidation film and has a pore diameter of 20-1,000 nm are arranged on a surface of the metal insert. The nanopore is filled with a resin composition from which the plastic part is made. As the nanopore is filled with the resin composition from which the plastic part is made, the metal insert and the plastic part are in close fit with each other, which greatly enhances the gluing capability of the metal insert and prevents the metal insert and the plastic part which are formed through injection (Continued)

molding from being separated. A length of a portion embedded into the plastic part of the metal insert is greatly reduced, such that transfer of ultrasonic energy is smooth. The metal plastic part is effectively prevented from ultrasonic unmelting. Thus, the waterproofness and the sealing property of the metal plastic part are improved. Accordingly, the performance of the sound generation device is improved.

13 Claims, 5 Drawing Sheets

(51) Int. Cl.
*C25D 11/02* (2006.01)
*B29C 45/14* (2006.01)
*B29K 705/02* (2006.01)
*B29K 705/12* (2006.01)
*B29L 31/38* (2006.01)
*C25D 11/04* (2006.01)
*C25D 11/34* (2006.01)
*H04R 9/02* (2006.01)
*H04R 31/00* (2006.01)

(52) U.S. Cl.
CPC .... *C25D 11/02* (2013.01); *B29C 2045/14868* (2013.01); *B29K 2705/02* (2013.01); *B29K 2705/12* (2013.01); *B29L 2031/38* (2013.01); *C25D 11/04* (2013.01); *C25D 11/34* (2013.01); *H04R 9/025* (2013.01); *H04R 31/00* (2013.01); *H04R 2201/029* (2013.01); *H04R 2231/003* (2013.01); *H04R 2307/027* (2013.01); *H04R 2400/11* (2013.01)

(58) Field of Classification Search
USPC .......................................... 381/167
See application file for complete search history.

(56) References Cited

FOREIGN PATENT DOCUMENTS

| CN | 103101189 A | 5/2013 |
|---|---|---|
| CN | 203827389 U | 9/2014 |
| CN | 104786426 A | 7/2015 |
| CN | 104816429 A | 8/2015 |
| CN | 106257937 A | 12/2016 |

* cited by examiner

Performing oxidation treatment a surface of a pre-treated metal insert to obtain a metal insert with an oxidation film, a nano pre-pore with a pore diameter of smaller than 10 nm being formed in a surface of the oxidation film Performing pore-enlarging on the nano pre-pore to obtain a metal insert with a nanopore that has a pore diameter of 20-1,000 nm Combining the metal insert that is subjected to metal nanocrystallization with a resin composition to obtain a metal plastic part

SOUND GENERATION DEVICE AND PREPARATION METHOD OF METAL PLASTIC PART

CROSS REFERENCE TO RELATED APPLICATIONS

This application is a National Stage of International Application No. PCT/CN2016/112621, filed on Dec. 28, 2016, which claims priority to Chinese Patent Application No. 201610284682.2, filed on Apr. 29, 2016, and Chinese Patent Application No. 201610451505.9, filed on Jun. 21, 2016, all of which are hereby incorporated by reference in their entireties.

TECHNICAL FIELD

The present invention relates to the field of acoustic products, and more particularly, to a sound generation device and a preparation method of a metal plastic part.

BACKGROUND

With the advancement of technology, electronic products such as a mobile phone, a computer and a television are increasingly demanding for the properties of waterproofness, sealing, etc. Thus, how to improve the waterproof and sealing properties of the electronic products has become a very important part in their designs.

Taking sound generation devices, speakers which are commonly used in the electronic products, for example, at present, common speakers mainly include moving-coil speakers, magnetic speakers, capacitive speakers, piezoelectric speakers, etc. The moving-coil speakers have the characteristics of relatively simple manufacture, low cost, low-frequency sound generation advantage, etc. A conventional moving-coil speaker, also known as a moving-coil speaker module, usually comprises a speaker module housing and a speaker unit. The speaker module housing comprises an upper housing and a lower housing which are combined together to form a chamber to accommodate the speaker unit.

To improve the strength of the speaker module housing and to reduce the thickness of a speaker module, a metal insert is usually disposed in the position, corresponding to the speaker unit, of the upper housing and/or the lower housing of the speaker module housing, and forms the upper housing and/or the lower housing of the speaker module housing together with a plastic part by injection molding. Since the metal insert and the plastic part are significantly different in material and low in binding force, the plastic part contracts with cold after injection molding and cooling of the two. A portion, in contact with the metal insert, of the plastic part is easy to separate from the metal insert. Consequently, a gap is formed between the metal insert and the plastic part and will deteriorate the waterproof and sealing properties of the speaker module.

Besides, in order to improve the binding force between the metal insert and the plastic part to avoid the gap formed therebetween as much as possible, the length of a portion embedded into the plastic part of the metal insert is usually increased. However, when the upper housing and the lower housing of the speaker module housing are combined by means of ultrasonic sealing (also known as ultrasonic welding), the relatively greater length of the portion embedded into the plastic part of the metal insert will affect transfer of ultrasonic energy to lead to ultrasonic unmelting near the metal insert, greatly reducing the waterproof and sealing properties of the speaker module.

SUMMARY

An objective of the present invention is to provide a novel technical solution of a sound generation device to improve a binding force between a metal insert and a plastic part and to prevent a metal plastic part from ultrasonic unmelting.

According to a first aspect of the present invention, there is provided a sound generation device. The sound generation device comprises a metal plastic part. The metal plastic part comprises a plastic part and a metal insert that is combined with the plastic part. An oxidation film that is obtained through metal nanocrystallization and a nanopore that is formed in a surface of the oxidation film and has a pore diameter of 20-1,000 nm are arranged on a surface of the metal insert. The nanopore is filled with a resin composition from which the plastic part is made.

Optionally, the sound generation device comprises a speaker module. The speaker module comprises a speaker module housing which is formed by fastening an upper housing, an intermediate housing and a rear cover to form a receiving chamber. The upper housing consists of the metal plastic part.

Optionally, the sound generation device comprises the speaker module. The speaker module comprises the speaker module housing which is formed by fastening the upper housing and a lower housing to form a receiving chamber. One or both of the upper housing and the lower housing consist(s) of the metal plastic part.

Optionally, the sound generation device comprises a speaker unit. The speaker unit comprises a vibration system, a magnetic circuit system and an auxiliary system configured to receive the vibration system and the magnetic circuit system. The auxiliary system consists of the metal plastic part.

Optionally, the auxiliary system comprises a front cover and a housing that is matched with the front cover. One or both of the front cover and the housing consist(s) of the metal plastic part.

Optionally, the nanopore has a pore diameter of 20-100 nm and a thickness of 1-8 μm.

Optionally, a portion, combined with the plastic part, of the metal insert has a length of 0.1-0.3 mm.

Optionally, the portion, combined with the plastic part, of the metal insert has the length of 0.2 mm.

Optionally, the portion, combined with the plastic part, of the metal insert adopts a tabulate structure. One end surface of the tabulate structure is not covered with the plastic part.

Optionally, bottoms of the nanopores are communicated with one another.

Optionally, an inner wall of the nanopore has an unsmooth surface.

Optionally, the resin composition is one or more of PPS, PBT, PA6 and PA66.

Optionally, the metal insert is made of aluminum, an aluminum alloy, steel or stainless steel.

Another objective of the present invention is to provide a novel technical solution of a preparation method of a metal plastic part to improve a binding force between a metal insert and a plastic part by forming a nanopore in a surface of the metal insert to obtain the metal plastic part of which the metal insert and the plastic part are difficult to separate and which may not cause ultrasonic unmelting easily.

According to a second aspect of the present invention, there is provided a preparation method of a metal plastic part, comprising:

step (1): performing oxidation treatment on a surface of a pre-treated metal insert to obtain a metal insert with an oxidation film, a nano pre-pore with a pore diameter of smaller than 10 nm being formed in a surface of the oxidation film;

step (2): performing pore-enlarging on the nano pre-pore in the step (1) to obtain a metal insert with a nanopore that has a pore diameter of 20-1,000 nm; and step (3): combining the metal insert that is subjected to metal nanocrystallization in the step (2) with a resin composition to obtain a speaker module housing.

Optionally, said oxidation treatment in the step (1) is anodic oxidation treatment and comprises:

placing the metal insert as an anode in an acid electrolyte, and performing electrolysis at a temperature of 15-25☐ and a voltage of 20-80 V to obtain the metal insert, which has the nano pre-pore with a pore diameter of smaller than 10 nm and an oxidation layer with a thickness of 5-30 μm.

Optionally, said pore-enlarging in the step (2) is soaking treatment with a pore-enlarging agent.

Optionally, the step (2) comprises:

soaking the metal insert with the nano pre-pore in the step (1) in an ammonium bicarbonate solution with a mass fraction of 13-20% for a period of time to obtain the metal insert with the nanopore that has a pore diameter of 20-1,000 nm and a thickness of 1-8 μm.

Optionally, the metal insert is also soaked in a polyacrylamide solution with a mass fraction of 10-20% for a period of time.

Optionally, the metal insert with the oxidation film in the step (1) and the metal insert subjected to metal nanocrystallization in the step (2) are washed.

The inventors of the present invention discovered that in the prior art, there do exist the problems that a gap is formed between the metal insert and the plastic part due to a small binding force therebetween and ultrasonic unmelting exists near the metal insert due to the excessively long portion of the metal insert embedded into the plastic part. Therefore, a technical task to be achieved or a technical problem to be solved by the present invention has never been thought of or expected by those skilled in the art. Thus, the present invention is a novel technical solution.

One beneficial effect of the present invention lies in that the nanopore with a pore diameter of 20-1,000 nm is formed in the surface of the oxidation film of the metal insert, and the nanopore is filled with the resin composition from which the plastic part is made. Therefore, the metal insert and the plastic part are in close fit with each other, which greatly enhances the gluing capability of the metal insert, improves the binding force between the metal insert and the plastic part and prevents the metal insert and the plastic part which are formed through injection molding from being separated. Besides, after the binding force between the metal insert and the plastic part is improved, the length of the portion embedded into the plastic part of the metal insert may be greatly reduced, such that transfer of ultrasonic energy is smooth. The metal plastic part is effectively prevented from ultrasonic unmelting. Thus, the waterproofness and the sealing property of the metal plastic part are improved. Accordingly, the performance of the sound generation device is improved.

Another beneficial effect of the present invention lies in that the oxidation film with the nano pre-pore that has a pore diameter of smaller than 10 nm is formed in the metal insert first, and then pore-enlarging is performed on the nano pre-pore. The method is simple in steps, easy to implement and excellent in reproducibility. Not only is the pore diameter of the nano pre-pore increased, but also the nanopore adopts a unique structure. The binding force between the metal insert and the plastic part is improved. An area of contact between the resin composition and the nanopore is large after the resin composition enters the nanopore. Air in the nanopore may be fully discharged, such that the metal insert and the plastic part are in close fit with each other, which greatly enhances the gluing capability of the metal insert, improves the binding force between the metal insert and the plastic part and prevents the metal insert and the plastic part which are formed through injection molding from being separated. Besides, after the binding force between the metal insert and the plastic part is improved, the length of the portion of the metal insert embedded into the plastic part may be greatly reduced, such that transfer of ultrasonic energy is smooth. The metal plastic part is effectively prevented from ultrasonic unmelting, thus obtaining the metal plastic part of which the metal insert and the plastic part are difficult to separate and which may not cause ultrasonic unmelting easily. The waterproofness and the sealing property of the metal plastic part are improved. Accordingly, the performance of the sound generation device is improved.

Further features of the present invention and its advantages will become apparent from the following detailed description of exemplary embodiments of the present invention with reference to the attached drawings.

BRIEF DESCRIPTION OF THE DRAWINGS

The accompanying drawings, which are incorporated in and constitute a part of the specification, illustrate an embodiment of the present invention and, together with the description, serve to explain the principles of the present invention.

Reference numbers in the drawings are described as below: speaker module—1; upper housing—11; plastic part—111; metal insert—112; oxidation film—1121; nanopore—1122; intermediate housing—12; rear cover—13; lower housing—14; speaker unit—2; vibration system—21; magnetic circuit system—22; front cover—23; housing—24.

DETAILED DESCRIPTION

Various exemplary embodiments of the present invention will now be described in detail with reference to the accompanying drawings. It should be noted that the relative arrangement of the components and steps, the numerical expressions, and numerical values set forth in these embodiments do not limit the scope of the present invention unless it is specifically stated otherwise.

The following description of at least one exemplary embodiment is merely illustrative in nature and is in no way intended to be in any way limiting on the present invention, its application, or uses.

Techniques, methods, and devices known to one of ordinary skill in the relevant art may not be discussed in detail, but the techniques, methods and devices should be considered as part of the specification where appropriate.

In all examples shown and discussed herein, any specific value should be interpreted as illustrative only and not as a limitation. Therefore, other examples of the exemplary embodiments may have different values.

It should be noted that like reference numerals and letters refer to similar items in the following figures, and therefore, once an item is defined in one figure, it need not be further discussed in subsequent figures.

To solve the problems that a gap is formed between a metal insert and a plastic part due to a small binding force therebetween and ultrasonic unmelting exists near the metal insert due to an excessively long portion of the metal insert embedded into the plastic part, the present invention provides a sound generation device. As shown in FIGS. 1-7, the sound generation device, which may be a speaker module, a speaker unit or the like that may make a sound, comprises a metal plastic part. When the sound generation device comprises the speaker module, a speaker module housing of the speaker module may consist of the metal plastic part. Or, when the sound generation device comprises the speaker unit that may work independently and make a sound, a frame of the speaker unit may consist of the metal plastic part. In this way, all components made from metal combined with plastics in the sound generation device may consist of the metal plastic part. The metal plastic part comprises a plastic part 111 and a metal insert 112 that is combined with the plastic part 111. The plastic part 111 is made from a resin composition. The plastic part 111 and the metal insert 112 are combined optionally by means of injection molding. It can be understood that all molding methods through which the metal and the plastics may be integrated may be applied to the present invention, in addition to injection molding. An oxidation film 1121 that is obtained through metal nanocrystallization and a nanopore 1122 that is formed in a surface of an oxidation film 1121 and has a pore diameter of 20-1,000 nm are arranged on a surface of the metal insert 112. The oxidation film 1121 on the surface of the metal insert 112 may only be arranged at a portion of the metal insert 112 combined with the plastic part 111. Or, the oxidation film 1121 is disposed on the whole surface of the metal insert 112. Whether the oxidation film 1121 covers the whole surface of the metal insert 112 may be determined according to actual demands and will not be limited by the present invention. The above-mentioned metal nanocrystallization means performing metal material surface nanocrystallization on the metal insert 112. Particularly, the metal material surface nanocrystallization may be surface self-nanocrystallization, coating or deposition surface nanocrystallization, or hybrid nanocrystallization. In the present invention, the metal nanocrystallization is performed on the metal insert 112 preferably by forming a surface layer (the oxidation film 1121) with a nanostructure on the surface of the metal insert 112 per se. By adoption of this metal nanocrystallization manner, there is no obvious interface between the nanostructured surface layer and a substrate, and the obtained nanopore is unique in structure and more centralized in pore diameter distribution. By comparing a combination between a 40-50 μm micropore obtained by laser boring on the surface of the metal insert 112 and the resin composition, with a combination between a 0.3-0.4 mm micropore obtained by punching on the surface of the metal insert 112 and the resin composition, the inventors discovered that the nanopore with a pore diameter of 20-1,000 nm and the resin composition have an excellent binding effect, and the nanopore 1122 with a pore diameter of 20-1,000 nm and the resin composition are combined more tightly due to the smaller pore diameter of the nanopore. That is, the resin composition has a high gluing capability. Thus, the plastic part 111 and the metal insert 112 are combined more stably. Besides, the specific type of the oxidation film 1121 may be determined according to actual demands. For example, the oxidation film 1121 may be an anodic oxide film that is formed on the surface when the metal insert 112 serves as an anode during an electrolysis process, or an oxidation film that is naturally formed when the metal insert 112 is under an air condition so long as the oxidation film 1121 with the nanopore 1122 may be formed on the surface of the metal insert 112 by metal nanocrystallization. The nanopore 1122 is filled with the resin composition from which the plastic part 111 is made. The process of filling the nanopore 1122 with the resin composition may be preferably realized through injection molding. During injection molding, high-temperature, high-pressure and high-speed impact conditions contribute to filling the nanopore 1122 with the resin composition sufficiently and more rapidly. Thus, increase of the binding force between the resin composition and the nanopore 1122 is facilitated.

According to the present invention, the nanopore 1122 with a pore diameter of 20-1,000 nm is formed in the surface of the oxidation film 1121 of the metal insert 112 and filled with the resin composition from which the plastic part 111 is made, such that the metal insert 112 and the plastic part 111 are in close fit with each other, which greatly enhances the gluing capability of the metal insert 112, improves the binding force between the metal insert 112 and the plastic part 111, prevents the metal insert 112 and the plastic part 111 that are formed through injection molding from being separated, and avoids forming the gap between the metal insert 112 and the plastic part 111. Besides, after the binding force between the metal insert 112 and the plastic part 111 is improved, the length of the portion of the metal insert 112 embedded into the plastic part 111 may be greatly reduced, such that transfer of ultrasonic energy is smooth. The metal plastic part is effectively prevented from ultrasonic unmelting. Thus, the waterproofness and the sealing property of the metal plastic part are improved. Accordingly, the performance of the sound generation device is improved.

In a specific embodiment of the present invention, as shown in FIGS. 1-4, the sound generation device comprises a speaker module 1. The speaker module 1 comprises a speaker module housing which is formed by fastening an upper housing 11, an intermediate housing 12 and a rear cover 13 to form a receiving chamber. The upper housing 11 and the intermediate housing 12 may be combined by means of ultrasonic sealing for example. The intermediate housing 12 and the rear cover 13 may be combined by means of gluing for example. The rear cover 13 may be preferably a metal rear cover. Those skilled in the art should understand that the receiving chamber of the speaker module housing receives the speaker unit and forms a front sound chamber and a rear sound chamber of the speaker module 1. The speaker unit comprises a vibration system and a magnetic circuit system. The vibration system comprises a vibrating diaphragm and a vibrating voice coil fixed one the side of the vibrating diaphragm. The vibrating diaphragm further comprises a vibrating diaphragm body and a DOME (spherical top) secured to a central position of the vibrating diaphragm body. The vibrating diaphragm body comprises a fixed portion, a concave or convex edge portion integrated with the fixed portion, and a planar portion arranged in the edge portion. The magnetic circuit system comprises a frame, as well as a magnet and a washer which are secured to the frame. The upper housing 11 consists of the metal plastic part 112. Preferably, the metal insert 112 which constitutes the upper housing 11 corresponds to the speaker unit. Besides, according to actual requirements on the structure and the performance of a speaker, the metal insert 112 which constitutes the upper housing 11 may not directly face the speaker unit. The metal insert 112 in the upper housing 11 contributes to improving the rigidity of the speaker module housing, such that the thickness of the speaker module is reduced to obtain an ultrathin speaker. In specific application, the upper housing 11 of the speaker module 1 consists of the plastic part 111 and the metal insert 112. That is, the upper housing 11 is made of plastics and metal. The intermediate housing 12 is wholly made of plastics.

Figure 5:
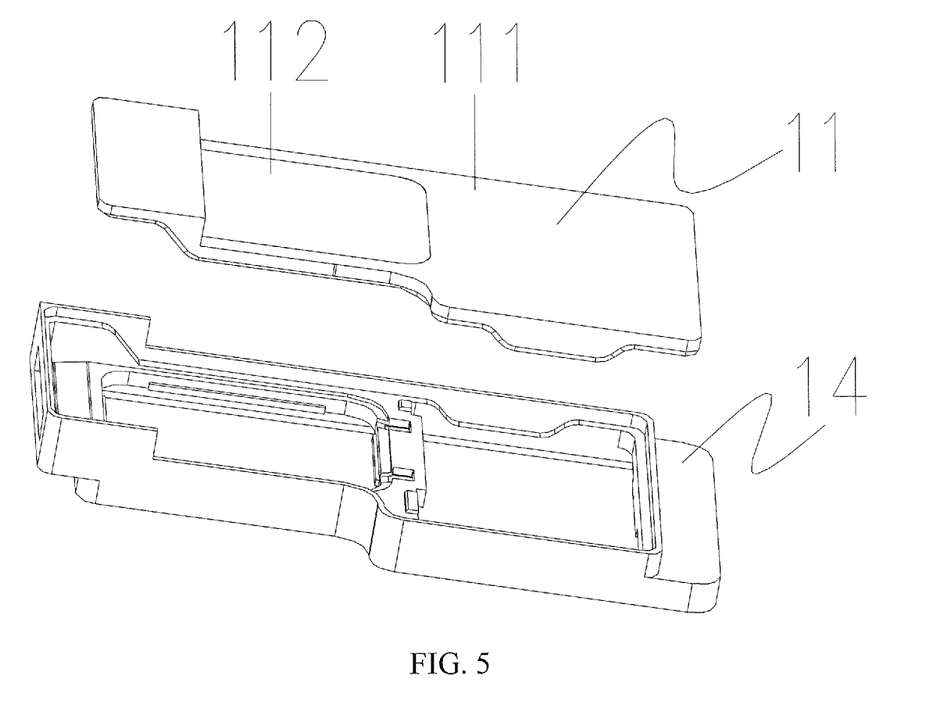
FIG. 5 is an exploded view of a partial structure of a second embodiment of the sound generation device of the present invention.

In another specific embodiment of the present invention, as shown in FIG. 5, the sound generation device comprises a speaker module 1. The speaker module 1 comprises a speaker module housing which is formed by fastening an upper housing 11 and a lower housing 14 to form a receiving chamber. The upper housing 11 and the lower housing 14 may be combined by means of ultrasonic sealing for example. Those skilled in the art should understand that the receiving chamber of the speaker module housing receives a speaker unit and forms a front sound chamber and a rear sound chamber of the speaker module 1. The speaker unit comprises a vibration system and a magnetic circuit system. The vibration system comprises a vibrating diaphragm and a vibrating voice coil fixed on the side of the vibrating diaphragm. The vibrating diaphragm further comprises a vibrating diaphragm body and a DOME (spherical top) secured to a central position of the vibrating diaphragm body. The vibrating diaphragm body comprises a fixed portion, a concave or convex edge portion integrated with the fixed portion, and a planar portion arranged in the edge portion. The magnetic circuit system comprises a frame, as well as a magnet and a washer which are secured to the frame. One or both of the upper housing 11 and the lower housing 14 consist(s) of the metal plastic part. That is, the upper housing 11 consists of the metal plastic part, or the lower housing 14 consists of the metal plastic part, or both the upper housing 11 and the lower housing 14 consist of the metal plastic part. Preferably, the metal insert which constitutes the upper housing 11 and/or the metal insert which constitutes the lower housing 14 correspond to the speaker unit. Besides, according to actual requirements on the structure and the performance of a speaker, the metal insert which constitutes the upper housing 11 and/or the lower housing 14 may not directly face the speaker unit. The metal insert in the upper housing 11 and/or the lower housing 14 contributes to improving the rigidity of the speaker module housing, such that the thickness of the speaker module is reduced to obtain an ultrathin speaker. In specific application, the upper housing 11 of the speaker module 1 consists of the plastic part 111 and the metal insert 112. That is, the upper housing 11 is made of plastics and metal. The lower housing 14 is wholly made of plastics.

Figure 6:
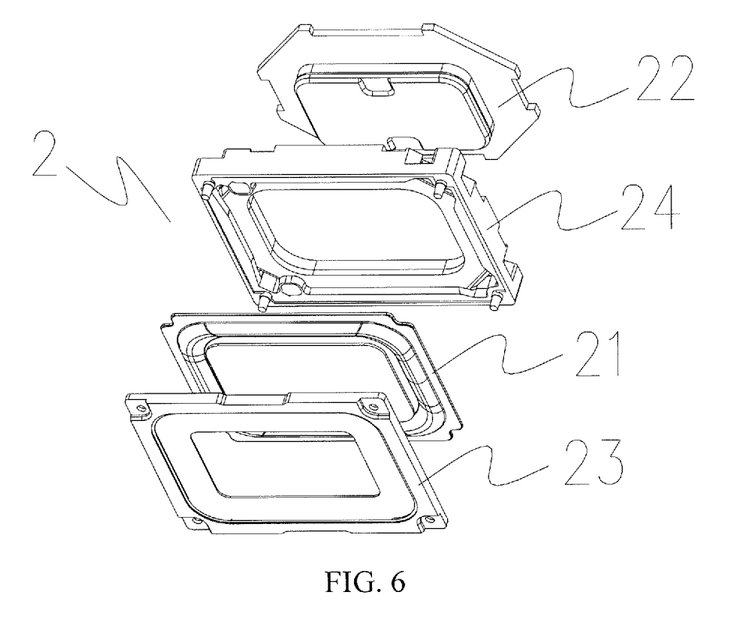
FIG. 6 is an exploded view of a third embodiment of the sound generation device of the present invention.

In a third specific embodiment of the present invention, as shown in FIG. 6, the sound generation device comprises a speaker unit 2. The speaker unit 2 comprises a vibration system 21, a magnetic circuit system 22 and an auxiliary system configured to receive the vibration system 21 and the magnetic circuit system 22. The auxiliary system consists of a metal plastic part, which contributes to improving the rigidity of the speaker unit 2. Thus, the thickness of the speaker unit is reduced to obtain an ultrathin speaker unit. Those skilled in the art should understand that the vibration system comprises a vibrating diaphragm and a vibrating voice coil secured to the side of the vibrating diaphragm. The vibrating diaphragm further comprises a vibrating diaphragm body and a DOME (spherical top) secured to a central position of the vibrating diaphragm body. The vibrating diaphragm body comprises a fixed portion, a concave or convex edge portion integrated with the fixed portion, and a planar portion arranged in the edge portion. The magnetic circuit system comprises a frame, as well as a magnet and a washer which are secured to the frame. Further, the auxiliary system comprises a front cover 23 and a housing 24 that is matched with the front cover 23. One or both of the front cover 23 and the housing 24 consist(s) of the metal plastic part. Those skilled in the art should understand that a voice hole that allows voice to exit is usually formed in the front cover 23. The housing 24 and the front cover 23 are matched with each other to receive and fix the vibration system 21 and the magnetic circuit system 22. In a specific implementation process, a positional relationship between the metal insert and the plastic part which constitute the front cover 23 or the housing 24 may be chosen according to actual demands. For example, the metal insert which constitutes the front cover 23 may be arranged in the middle of the plastic part which constitutes the front cover 23. For another example, the metal insert which constitutes the housing 24 may be arranged at a corner of the plastic part which constitutes the housing 24.

To improve the binding force between the nanopore 1122 and the resin composition, the nanopore 1122 has a pore diameter of 20-100 nm and a thickness of 1-8 μm. Further, the nanopore 1122 has a depth of 1-4 μm or 3-8 μm.

Optionally, a length L of a portion combined with the plastic part 111 of the metal insert is 0.1-0.3 mm. Further, the length L is preferably 0.2 mm and means a length of a projection of the portion combined with the plastic part 111 of the metal insert 112 on a plane where an even surface of the metal insert 112 is situated. The inventors of the present invention discovered that the portion of the metal insert, which is combined with the plastic part, is not subjected to metal nanocrystallization, has no oxidation film on the surface and is arranged on the nanopore in the surface of the oxidation film, has the length of at least 0.4 mm or even 0.7 mm. Besides, even if the length reaches 0.7 mm, it still may not be guaranteed that the metal insert and the plastic part cannot be separated. The portion of the metal insert 112, which is combined with the plastic part 111, is not subjected to metal nanocrystallization, has no oxidation film on the surface and is arranged on the nanopore 1122 in the surface of the oxidation film 1121, has the length that may be reduced to 0.1 mm. Under the condition that the length is 0.1 mm, an excellent binding force may be guaranteed between the metal insert 112 and the plastic part 111. Thus, the length of the portion embedded into the plastic part of the metal insert is greatly reduced. Accordingly, an ultrasonic sealing effect of the sound generation device is guaranteed.

Figure 7:
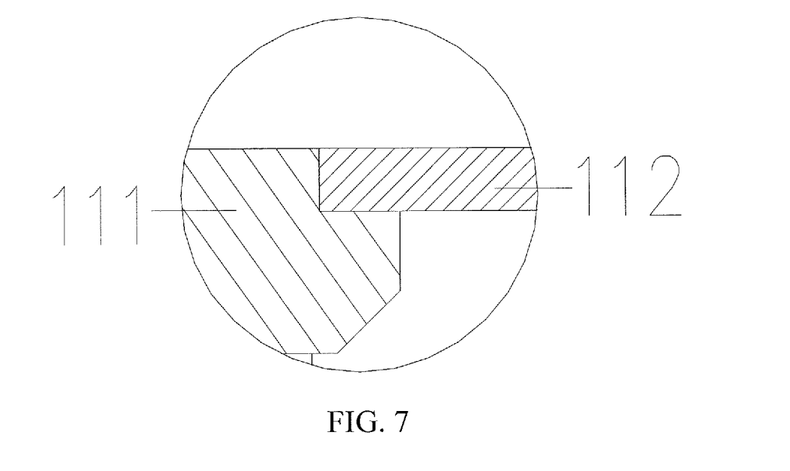
FIG. 7 is a local detailed view of a fourth embodiment of the sound generation device of the present invention.

As shown in FIG. 7, the present invention further provides a fourth embodiment of the sound generation device. In this embodiment, the portion, combined with the plastic part 111, of the metal insert 112 adopts a tabulate structure. One end surface of the tabulate structure is not covered with the plastic part 111. Compared with a curved structure of the portion combined with the plastic part 111 of the metal insert 112, the tabulate structure in this embodiment has the advantages that the difficulty of combination between the metal inert 112 and the plastic part 111 is reduced, preparation of the sound generation device is favorably simplified, and transfer of ultrasonic energy is smoother in an ultrasonic sealing process under the condition that the length of the portion embedded into the plastic part of the metal insert is relatively smaller. Taking a speaker module for example, that one end surface of the tabulate structure is not covered with the plastic part 111 means that one end surface, away from a speaker unit, of the tabulate structure in a length direction, of the tabulate structure is not wrapped in the plastic part 111 but in contact with the outside, such that metal nanocrystallization may only be performed on the surface, combined with the plastic part 111, of the metal insert 112. Certainly, metal nanocrystallization may also be performed on the entire metal insert 112. Further, in a specific embodiment, owing to existence of the nanopore 1122, the length of the portion embedded into the plastic part 111 of the metal insert 112 is greatly reduced. The metal insert 112 may be a slab. That is, the portion, combined with the plastic part 111, of the metal insert 112 is in straight transition with the rest portion of the metal insert 112 without specially designing a portion, combined with the plastic part 111, on the metal insert 112. Thus, the structure of the metal insert 112 is simplified. The difficulty of combination between the metal insert 112 and the plastic part is reduced.

Since air exists in the nanopore 1122 before the nanopore 1122 is filled with the resin composition, if the air in the nanopore 1122 fails to be completely discharged, a cavity will be formed between the metal insert 112 and the plastic part 111, which greatly reduces the binding force between the metal insert 112 and the plastic part 111. To completely discharge the air in the nanopore 1122, bottoms of the nanpores 1122 are communicated with one another. That is, openings, in the surface of the oxidation film 1121, of a plurality of nanopores 1122 are spaced. Meanwhile, the bottoms, in the oxidation film 1121, of a plurality of nanopores 1122 are communicated. Thus, a porous structure through which the bottoms of the plurality of nanopores are communicated is formed in the oxidation film 1121. This porous structure in the oxidation film 1121 may increase the area of contact between the metal insert 112 and the plastic part 111, and therefore, improves the binding force between the metal insert 112 and the plastic part 111. Besides, instead of communicating the bottoms of all the nanopores 1122 by the porous structure in the oxidation film 1121, a plurality of porous structures through which the bottoms of the nanopores 1122 may be communicated may be formed in the oxidation film 1121. Optionally, the porous structure may have a pore diameter of 20-1,000 nm.

Figure 1:
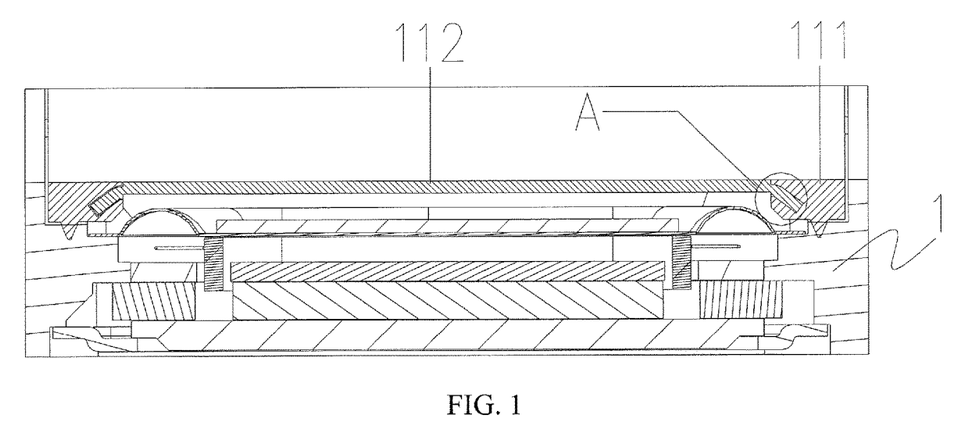
FIG. 1 is a sectional view of a first embodiment of a sound generation device of the present invention.
Figure 2:
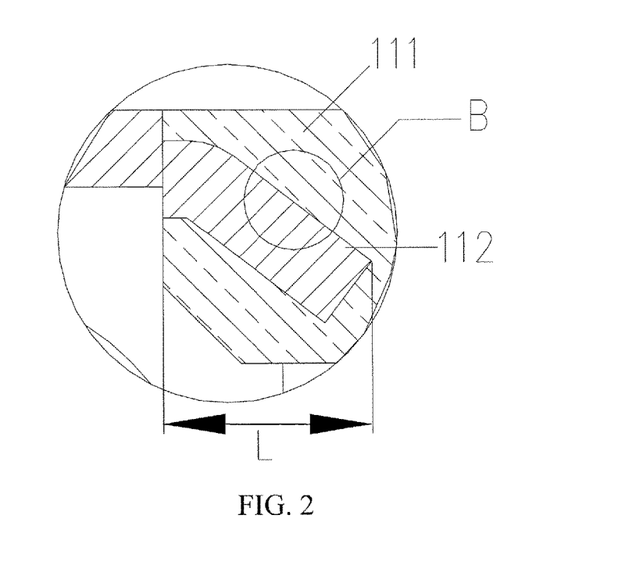
FIG. 2 is an enlarged view of part A in FIG. 1.
Figure 3:
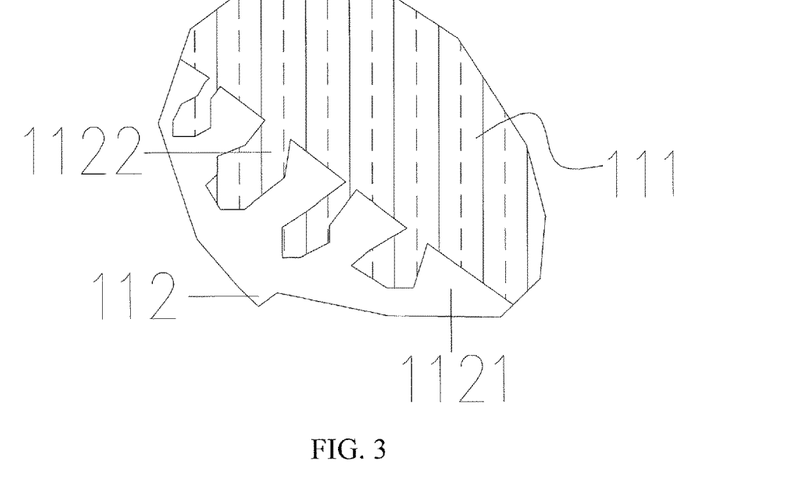
FIG. 3 is an enlarged view of part B in FIG. 2.
Figure 4:
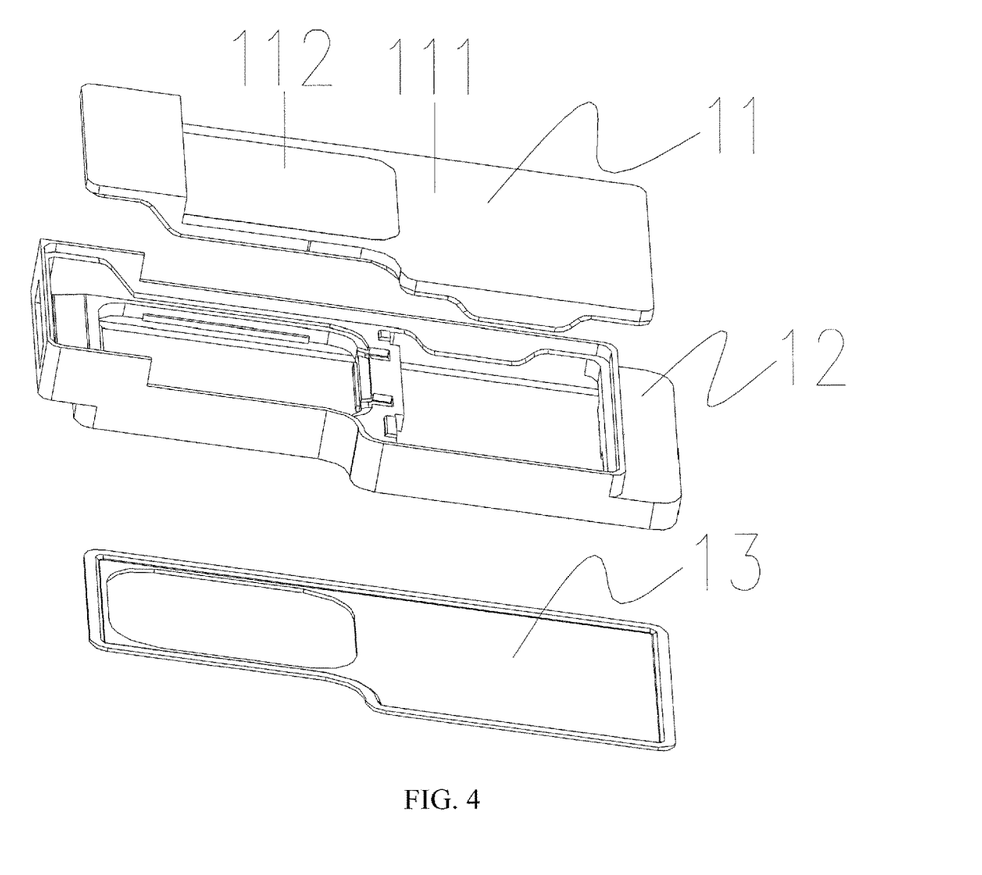
FIG. 4 is an exploded view of a partial structure in FIG. 1.

Optionally, an inner wall of the nanopore 1122 has an unsmooth surface. This unsmooth surface may be realized by forming a concave or convex structure on the inner wall of the nanopore 1122. For example, as shown in FIG. 3, at least one groove with a sharp edge is formed in the inner wall of the nanopore 1122. The nanopore 1122 of which the inner wall has the unsmooth surface may greatly improve the binding force between the metal insert 112 and the plastic part 111.

Optionally, the resin composition is one or more of PPS (polyphenylene sulfide), PBT (polybutylene terephthalate), PA6 (polyamide 6) and PA66 (polyamide 66). That is, the plastic part 111 is made from one or more of PPS, PBT, PA6 and PA66.

Optionally, the metal insert 112 is made of aluminum, an aluminum alloy, steel or stainless steel. Further, the metal insert 112 is made of aluminum or an aluminum alloy, which is not only light in weight but also high in strength. By taking aluminum or an aluminum alloy as an anode, the oxidation film 1121 that is formed on aluminum or an aluminum alloy through electrolysis is uniform in thickness. The obtained nanopore 1122 is centralized in pore diameter distribution.

Figure 8:
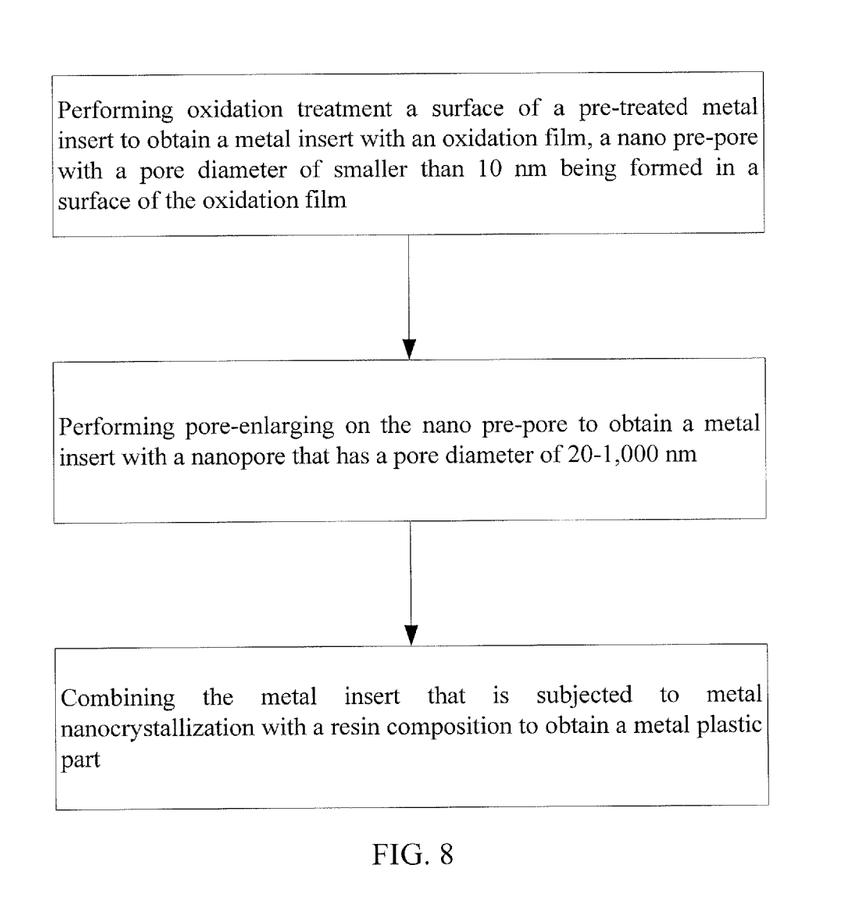
FIG. 8 is a flow chart of a preparation method of a metal plastic part of the present invention.

The present invention further provides a preparation method of a metal plastic part. As shown in FIG. 8, the preparation method comprises the following steps.

Step (1) includes performing oxidation treatment on a surface of a pre-treated metal insert to obtain a metal insert with an oxidation film. A nano pre-pore with a pore diameter of smaller than 10 nm is formed in a surface of the oxidation film. The metal insert may be made of a common metal material in the art, such as aluminum, an aluminum alloy, steel or stainless steel, and is preferably made of aluminum or an aluminum alloy. Said pretreatment means removal of impurities including foreign matters, oil dirt, natural oxide layers and the like from a surface of the metal material. The above-mentioned pretreatment in the present invention may be a pretreatment procedure that is commonly used by those skilled in the art on the surface of the metal material. Said pretreatment generally comprises performing polishing or grinding to remove the obvious foreign matters on the surface, and then performing degreasing and washing on processing oil and the like attached onto a metal surface. Preferably, said pretreatment comprises polishing the surface of the metal insert, then washing the metal insert in ultrasonic waves with various solvents that are commonly used by those skilled in the art to remove oil dirt on the surface of a metal housing body, placing the metal insert into an acid/alkaline aqueous solution, and wahsing the surface of the metal insert under an ultrasonic condition. Said oxidation treatment of the surface of the metal insert can be realized by means of anodic oxidation which may be an anodic oxidation technology known by those skilled in the art. An oxidized portion on the surface of the metal insert may be only arranged at a portion, combined with the plastic part, of the metal insert. Or, oxidation treatment is performed on the whole surface of the metal insert. Nano pre-pores with small pore diameters are distributed in the oxidation film of the metal insert that is subjected to oxidation treatment.

Step (2) includes performing pore-enlarging on the nano pre-pore in the step (1) to obtain a metal insert with a nanopore that has a pore diameter of 20-1,000 nm. Said pore-enlarging means enlarging the pore diameter of the nano pre-pore by various measures known in the art. For example, a pore-enlarging agent is adopted to perform pore-enlarging on the nano pre-pore. Preferably, bottoms of the nanopores subjected to pore-enlarging are communicated with one another. That is, a porous structure through which the bottoms of a plurality of nanopores are communicated is formed in the oxidation film. Instead of communicating the bottoms of all the nanopores by the porous structure in the oxidation film, a plurality of porous structures through which the bottoms of the nanopores may be communicated may be formed in the oxidation film. Optionally, the porous structure may have a pore diameter of 20-1,000 nm.

Step (3) includes combining the metal insert that is subjected to metal nanocrystallization in the step (2) with a resin composition to obtain a speaker module housing. The metal insert and the resin composite are combined optionally by means of injection molding. It may be understood that all molding methods through which the metal and the plastic may be integrated may be applied to the present invention, in addition to injection molding. The resin composition may be various resin compositions that may be used for manufacturing, for example, a speaker module housing, of a sound generation device, which will not be specially limited by the present invention and may be chosen according to actual demands. For example, the resin composition may be a thermoplastic resin composition. For another example, the resin composition may be made from one or more of PPS, PBT, PA6 and PA66.

It is easily conceivable for those skilled in the art that after preparation of the metal plastic part according to the method provided by the present invention, the metal plastic part may be combined with other components of the sound generation device so as to obtain an integral sound generation device.

According to the preparation method of the metal plastic part, the oxidation film which has the nano pre-pore with a pore diameter of smaller than 10 nm is formed on the metal insert first. Then, pore-enlarging is performed on the nano pre-pore. The preparation method is simple in steps, easy to implement and excellent in reproducibility. Not only is the pore diameter of the nano pre-pore increased, but also the nanopore adopts a unique structure. The binding force between the metal insert and the plastic part is improved. An area of contact between the resin composition and the nanopore is large after the resin composition enters the nanopore. Air in the nanopore may be fully discharged, such that the metal insert and the plastic part are in close fit with each other, which greatly enhances the gluing capability of the metal insert, improves the binding force between the metal insert and the plastic part and prevents the metal insert and the plastic part which are formed through injection molding from being separated. Besides, after the binding force between the metal insert and the plastic part is improved, the length of the portion of the metal insert embedded into the plastic part may be greatly reduced, such that transfer of ultrasonic energy is smooth. The metal plastic part is effectively prevented from ultrasonic unmelting, thus obtaining the metal plastic part of which the metal insert and the plastic part are difficult to separate and which may not cause ultrasonic unmelting easily. The waterproofness and the sealing property of the metal plastic part are improved.

Optionally, said oxidation treatment in the step (1) is anodic oxidation treatment and comprises: placing the metal insert as an anode in an acid electrolyte, and performing electrolysis at a temperature of 15-25□ and a voltage of 20-80 V to obtain the metal insert, which has the nano pre-pore with a pore diameter of smaller than 10 nm and an oxidation layer with a thickness of 5-30 μm. The oxidation film obtained through anodic oxidation treatment is uniform in thickness. The binding force between the oxidation film and a substrate is strong. The nano pre-pores are uniformly distributed and centralized in pore diameter distribution. Particularly, when the metal insert is made of aluminum or an aluminum alloy, the acid electrolyte may be sulfuric acid, chromic acid, oxalic acid or the like. The obtained nano pre-pore is 1-2 μm in depth.

For more convenient pore-enlarging of the nano pre-pore, said pore-enlarging in the step (2) is soaking treatment with a pore-enlarging agent. Optionally, the pore-enlarging agent is ammonium bicarbonate.

More particularly, the step (2) comprises: soaking the metal insert with the nano pre-pore in the step (1) in an ammonium bicarbonate solution with a mass fraction of 13-20% for a period of time to obtain the metal insert with the nanopore that has a pore diameter of 20-1,000 nm and a thickness of 1-8 μm. Bottoms of the nanopores obtained in this pore-enlarging mode are communicated with one another. The nanopores are uniform in size. The metal insert is soaked in the ammonium bicarbonate solution for 120 min preferably. Preferably, the nanopore has a pore diameter of 20-100 nm and the depth of 1-4 jun or 3-8 μm.

Further, to improve the distribution uniformity and the size uniformity of the nanopore, the metal insert is also soaked in a polyacrylamide solution with a mass fraction of 10-20% for a period of time, preferably, 4 h. This step may be preferably performed after the metal insert is soaked in the ammonium bicarbonate solution and washed.

Optionally, the metal insert with the oxidation film in the step (1) and the metal insert subjected to metal nanocrystallization in the step (2) are washed. Said washing means washing an electrolyte or a pore-enlarging solution that remains on the metal insert. Said washing in the present invention may be a washing procedure commonly used by those skilled in the art. For example, the metal insert may be cleaned by an ultrasonic or hydrothermal method in such washing solutions as heated deionized water and ethyl alcohol. The heating temperature may be 140□.

The preparation method provided by the present invention is described below in detail through a specific embodiment.

Embodiment I

A pre-treated aluminum metal insert is placed as an anode in a sulfuric acid electrolyte with a mass fraction of 10-20%. Electrolysis is performed at a temperature of 15-25□ and a voltage of 20-80 V for 50 min to obtain the metal insert, which has the nano pre-pore with a pore diameter of smaller than 10 nm and an oxidation layer with a thickness of 5-30 μm. The metal insert with the nano pre-pore is soaked in an ammonium bicarbonate solution with a mass fraction of 13-20% for 120 min to obtain the metal insert with the nanopore that has a pore diameter of 20-1,000 nm and a thickness of 1-8 μm. The metal insert with the nanopore is placed in a mold. Then, a resin composition is injected into the mold to be combined with the metal insert so as to obtain a metal plastic part.

Figure 9:
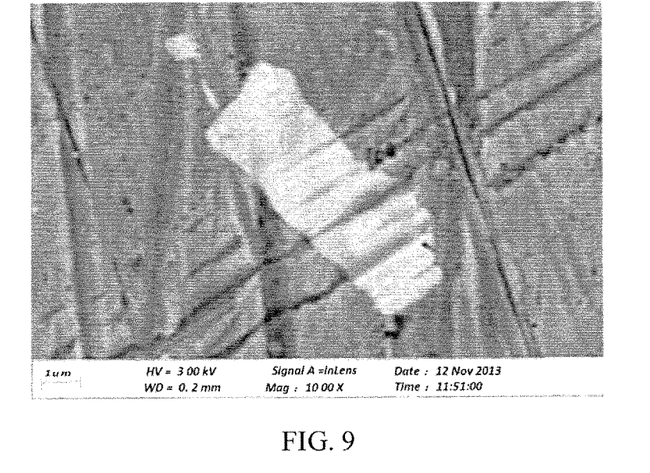
FIG. 9 is an SEM view of a surface not subjected to oxidation treatment of a metal insert in an embodiment I of the preparation method of the metal plastic part of the present invention.
Figure 10:
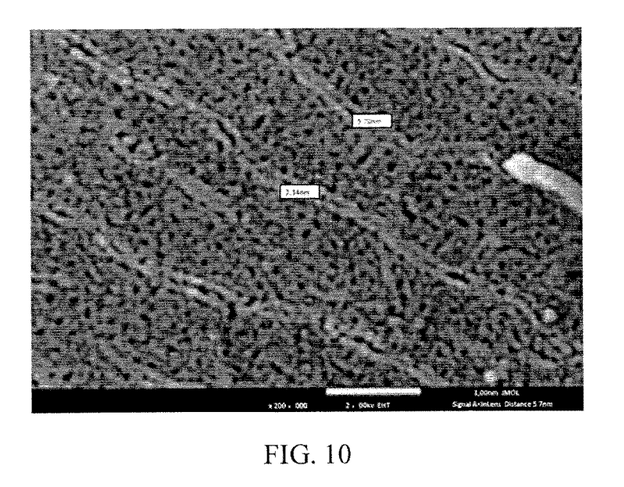
FIG. 10 is an SEM view of a surface subjected to oxidation treatment of the metal insert in the embodiment I of the preparation method of the metal plastic part of the present invention.
Figure 11:
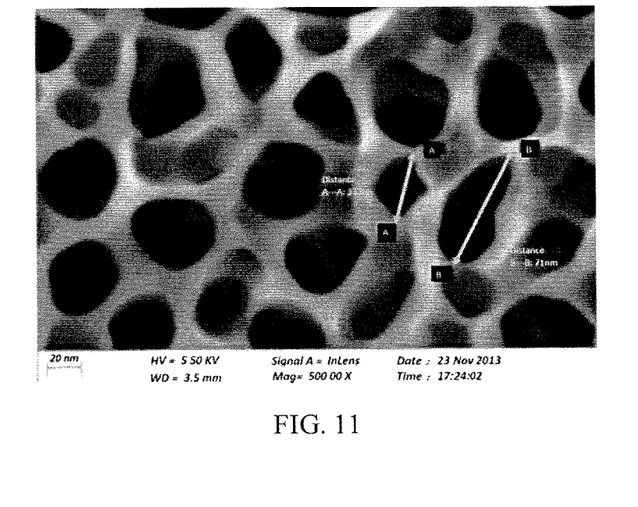
FIG. 11 is an SEM view of a surface subjected to pore-enlarging of the metal insert in the embodiment I of the preparation method of the metal plastic part of the present invention.

FIG. 9 is an SEM view of a surface of a metal insert not subjected to oxidation treatment in the embodiment I. FIG. 10 is an SEM view of a surface of a metal insert subjected to oxidation treatment in the embodiment I. FIG. 11 is an SEM view of a surface subjected to pore-enlarging of the metal insert in the embodiment I. It can be seen from FIGS. 9-11 that only a shallow pit is formed in the surface of the metal insert not subjected to oxidation treatment, smallsized nano pre-pores are uniformly distributed on the surface of the metal insert subjected to oxidation treatment, and nanopores with consistent pore diameters are uniformly distributed on the surface of the metal insert subjected to pore-enlarging.

Although some specific embodiments of the present invention have been described in detail by way of example, it will be understood by those skilled in the art that the above examples are for illustrative purposes only and are not intended to limit the scope of the present invention. It should be understood by those skilled in the art that the above embodiments may be modified without departing from the scope and spirit of the present invention. The scope of the present invention is defined by the appended claims.

The invention claimed is:

1. A sound generation device, comprising:
a metal plastic part, wherein the metal plastic part comprises a plastic part and a metal insert that is combined with the plastic part;
an oxidation film that is obtained through metal nanocrystallization; and
a nanopore that is formed in a surface of the oxidation film,
wherein the oxidation film and the nanopore are formed on a surface of the metal insert,
wherein the nanopore is formed in the surface of the oxidation film through pore-enlarging on a nano pre-pore,
wherein the nano pre-pore has a pore diameter of less than 10 nm and is formed in the surface of the oxidation film through the metal nanocrystallization,
wherein the nanopore has a pore diameter of 20-1,000 nm, and
wherein the nanopore is filled with a resin composition from which the plastic part is made.

2. The sound generation device of claim 1, comprising a speaker module, wherein the speaker module comprises a speaker module housing which is formed by fastening an upper housing, an intermediate housing and a rear cover to form a receiving chamber, and the upper housing consists of the metal plastic part.

3. The sound generation device of claim 1, comprising a speaker module, wherein the speaker module comprises a speaker module housing which is formed by fastening an upper housing and a lower housing to form a receiving chamber, and one or both of the upper housing and the lower housing consist(s) of the metal plastic part.

4. The sound generation device of claim 1, comprising a speaker unit, wherein the speaker unit comprises a vibration system, a magnetic circuit system and an auxiliary system configured to receive the vibration system and the magnetic circuit system, and the auxiliary system consists of the metal plastic part.

5. The sound generation device of claim 4, wherein the auxiliary system comprises a front cover and a housing that is matched with the front cover, and one or both of the front cover and the housing consist(s) of the metal plastic part.

6. The sound generation device of claim 1, wherein the nanopore has a pore diameter of 20-100 nm and a thickness of 1-8 μm.

7. The sound generation device of claim 1, wherein a portion, combined with the plastic part, of the metal insert has a length of 0.1-0.3 mm.

8. The sound generation device of claim 7, wherein the portion, combined with the plastic part, of the metal insert has the length of 0.2 mm.

9. The sound generation device of claim 1, wherein the portion, combined with the plastic part, of the metal insert adopts a tabulate structure, and one end surface of the tabulate structure is not covered with the plastic part.

10. The sound generation device of claim 1, wherein bottoms of the nanopores are communicated with one another.

11. The sound generation device of claim 1, wherein an inner wall of the nanopore has an unsmooth surface.

12. The sound generation device of claim 1, wherein the resin composition is one or more of PPS (polyphenylene sulfide), PBT (polybutylene terephthalate), PA6 (polyamide 6) and PA66 (polyamide 66).

13. The sound generation device of claim 1, wherein the metal insert is made of aluminum, an aluminum alloy, steel or stainless steel.

* * * * *